United States Patent
Kim et al.

(10) Patent No.: US 12,227,425 B2
(45) Date of Patent: Feb. 18, 2025

(54) HYDROPHOBIC SILICA AEROGEL BLANKET AND METHOD FOR PREPARING SAME

(71) Applicant: LG CHEM, LTD., Seoul (KR)

(72) Inventors: Young Hun Kim, Daejeon (KR); Se Won Baek, Daejeon (KR); Kyoung Shil Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 231 days.

(21) Appl. No.: 17/761,685

(22) PCT Filed: Jun. 17, 2021

(86) PCT No.: PCT/KR2021/007628
§ 371 (c)(1),
(2) Date: Mar. 18, 2022

(87) PCT Pub. No.: WO2021/256879
PCT Pub. Date: Dec. 23, 2021

(65) Prior Publication Data
US 2022/0380222 A1    Dec. 1, 2022

(30) Foreign Application Priority Data
Jun. 19, 2020  (KR) .................. 10-2020-0075290

(51) Int. Cl.
*C01B 33/158*    (2006.01)
*B01J 13/00*    (2006.01)
(Continued)

(52) U.S. Cl.
CPC ....... *C01B 33/1585* (2013.01); *B01J 13/0091* (2013.01); *C01B 33/155* (2013.01); *C04B 14/064* (2013.01)

(58) Field of Classification Search
CPC .............. C01B 33/155; C01B 33/1585; C01B 33/16; C04B 14/064; B01J 13/0091
See application file for complete search history.

(56) References Cited

U.S. PATENT DOCUMENTS

| 5,789,075 A | 8/1998 | Frank et al. |
| 5,955,049 A | 9/1999 | Ogata et al. |
| 2006/0174585 A1 | 8/2006 | Barr |

(Continued)

FOREIGN PATENT DOCUMENTS

| JP | 3341278 | 11/2002 |
| JP | 2007-538175 | 12/2007 |

(Continued)

OTHER PUBLICATIONS

Talebi et al., "Silica aerogel/polyester blankets for efficient sound absorption in buildings," Construction and Building Materials 220:76-89 (2019).

(Continued)

*Primary Examiner* — Catherine A. Simone
(74) *Attorney, Agent, or Firm* — Bryan Cave Leighton Paisner LLP (57) ABSTRACT

Provided is a hydrophobic silica aerogel blanket comprising holes, so that the diffusion of a surface modifier is facilitated in a blanket during a surface modification process to improve the efficiency of surface modification. Accordingly, the hydrophobic silica aerogel has not only excellent physical properties such as specific surface area and thermal conductivity, but also a controlled degree of hydrophobicity, and thus, can have high hydrophobicity.

5 Claims, 1 Drawing Sheet

(51) Int. Cl.
   *C01B 33/155* (2006.01)
   *C04B 14/06* (2006.01)

(56) References Cited

U.S. PATENT DOCUMENTS

| | | | |
|---|---|---|---|
| 2014/0150242 A1* | 6/2014 | Kratel | C07F 7/025 29/527.1 |
| 2018/0001576 A1 | 1/2018 | Koebel et al. | |
| 2018/0029892 A1 | 2/2018 | Yu et al. | |
| 2018/0147811 A1 | 5/2018 | Oh et al. | |
| 2018/0179073 A1 | 6/2018 | Oh et al. | |
| 2018/0312407 A1 | 11/2018 | Oh et al. | |
| 2019/0071818 A1 | 3/2019 | Ooshiro et al. | |
| 2020/0048100 A1 | 2/2020 | Yu et al. | |
| 2020/0108583 A1 | 4/2020 | Oikawa et al. | |
| 2020/0255295 A1 | 8/2020 | Kim et al. | |
| 2021/0131025 A1 | 5/2021 | Ooshiro et al. | |

FOREIGN PATENT DOCUMENTS

| | | |
|---|---|---|
| JP | 2018511663 | 4/2018 |
| JP | 2018-111803 | 7/2018 |
| JP | 2018534219 | 11/2018 |
| JP | 2019502624 | 1/2019 |
| JP | 2020060291 | 4/2020 |
| KR | 10-2009-0078357 | 7/2009 |
| KR | 10-0967421 | 7/2010 |
| KR | 10-2015-0088412 | 8/2015 |
| KR | 10-1748527 | 6/2017 |
| KR | 101938655 | 1/2019 |
| KR | 10-1955184 | 3/2019 |
| KR | 10-2019-0094917 | 8/2019 |
| WO | 2008-051029 A1 | 5/2008 |
| WO | 2017159438 | 9/2017 |
| WO | 2018056626 | 3/2018 |
| WO | 2019-160368 | 8/2019 |

OTHER PUBLICATIONS

Chakraborty et al., "Synthesis and Characterization of Fibre Reinforced Silica Aerogel Blankets for Thermal Protection," Advances in Materials Science and Engineering, vol. 2016, Article ID 2495623 (2016), 8 pages.

* cited by examiner

HYDROPHOBIC SILICA AEROGEL BLANKET AND METHOD FOR PREPARING SAME

CROSS-REFERENCE TO RELATED APPLICATIONS

This application is a National Stage Application of International Application No. PCT/KR2021/007628 filed on Jun. 17, 2021, which claims the benefit of Korean Patent Application No. 10-2020-0075290, filed on Jun. 19, 2020, in the Korean Intellectual Property Office, the disclosure of which is incorporated herein in its entirety by reference.

TECHNICAL FIELD

The present invention relates to a highly hydrophobic silica aerogel blanket with an excellent surface modification efficiency, and a method for preparing the same.

BACKGROUND

An aerogel is a super-porous, high specific surface area ($\geq 500$ m$^2$/g) material having a porosity of about 90 to 99.9% and a pore size in the range of 1-100 nm, and is a material having excellent properties of ultra-light weight, super thermal insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for super capacitors, and electrode materials for seawater desalination have been actively conducted.

The biggest advantage of an aerogel is that the aerogel has super-insulation properties exhibiting a thermal conductivity of 0.300 W/m·K or less, which is lower than that of an organic insulation material such as conventional Styrofoam. In addition, fire vulnerability and the generation of harmful gases in case of fire which are fatal weaknesses of an organic insulation material may be solved.

However, since the preparation process thereof is complex and the preparation cost thereof is high, aerogel is used only for extremely limited uses, despite having such excellent material properties. In addition, due to its high porosity, aerogel has very poor mechanical strength, so that there is a disadvantage in that aerogel is prone to break even by a minor impact. Therefore, in recent years, an aerogel blanket complexation technique has been studied to compensate for the above disadvantages of aerogel itself and enable processing in various forms.

An aerogel blanket is an aerogel material subjected to complexation and made in the form of a mattress or sheet, and has characteristics of being bent, folded, or cut due to the flexibility thereof. Therefore, the aerogel blanket may be applied to pipe insulation, clothing, or the like, and various industrial applications thereof are also possible. The aerogel blanket has flexibility since it is a composite composed of fiber and aerogel. The fiber serves to reinforce the flexibility and mechanical strength of the aerogel blanket, and the aerogel imparts thermal insulation properties due to its porosity. It is a key complexation technique of the aerogel blanket in that features of the fiber and features of the aerogel are complexed to strength the advantages of the fiber and the aerogel and compensate for the disadvantages thereof.

Such an aerogel blanket is a new material superior in heat resistance and thermal insulation to polystyrene foam or polyurethane foam, which is a conventional polymer insulation material, and is attracting attention as a high-tech material capable of solving energy saving and environmental problems to be unfolded in the future.

Typically, an aerogel blanket is prepared by mixing fiber with silica sol obtained from water glass or an alkoxide-based precursor, followed by gelling, and then aging, surface modifying, and drying.

However, in the case of an aerogel blanket prepared by the typical method, silica sol is subjected to surface modification after being impregnated in fiber. Therefore, when compared to aerogel not impregnated in fiber, the diffusion of a surface modifier is not facilitated, so that there is a problem in that surface modification efficiency is relatively low and surface modification is not uniformly achieved in the aerogel blanket.

When the surface modification of the aerogel blanket, that is, the hydrophobic modification, is not achieved smoothly overall, there is a problem in that hydrophobicity is easily lost during high temperature firing of 400° C. or higher. As the temperature increases during firing, a hydrophobic group inside an aerogel pore, for example, a methyl group or an ethyl group, may be combusted to lose hydrophobicity. If hydrophobicity is lost, not only thermal insulation performance is degraded due to moisture penetration, but also a pore structure collapses due to shrinkage during an evaporation process of the penetrated moisture, so that the thermal insulation performance is permanently lost.

For example, U.S. Pat. No. 5,789,075 discloses a method for preparing an aerogel blanket using water glass or an alkoxide-based precursor alone as a precursor of silica sol. However, when the water glass is used alone, a spring-back effect does not occur during drying, thereby reducing thickness to prevent exhibiting porosity of 90% or higher, resulting in a disadvantage of high thermal conductivity. When the alkoxide-based precursor is used alone, properties such as thermal conductivity of an aerogel blanket are excellent in the beginning, but there is a problem in that hydrophobicity is easily lost during high temperature treatment, so that the function as an insulator is not exerted, and there is a problem in that the alkoxide-based precursor is expensive, and thus, uneconomical.

Therefore, in order to use the aerogel blanket as an insulation material and the like, it is important to maintain high hydrophobicity by allowing a hydrophobic group to be stably present in a pore, thereby preventing thermal insulation performance from degrading. Therefore, there is a need for an aerogel blanket having high hydrophobicity and a technique for preparing the same.

PRIOR ART DOCUMENT

Patent Document (Patent Document 1) U.S. Pat. No. 5,789,075 B

DETAILED DESCRIPTION FOR INVENTION

Technical Problem

An aspect of the present invention provides a silica aerogel blanket having excellent physical properties such as specific surface area and thermal conductivity, and also the degree of hydrophobicity of which is controlled to have high hydrophobicity.

Another aspect of the present invention provides a method for preparing hydrophobic silica aerogel, the method capable of preparing silica aerogel having high hydrophobicity by easily controlling a surface modification reaction.

Technical Solution

According to an aspect of the present invention, there is provided a silica aerogel blanket including two or more holes having an average diameter of 0.01 mm to 3.20 mm on a surface, wherein the gap between the holes is 1.5 mm to 50.0 mm, and the aspect ratio of the cross-section of the holes is 1.00 to 5.00.

According to another aspect of the present invention, there is provided a method for preparing a hydrophobic silica aerogel blanket, the method including 1) preparing a silica sol, 2) impregnating the silica sol into a base material for a blanket, 3) gelling the silica sol impregnated into the base material for a blanket to form a silica wet gel blanket, 4) adding an inorganic acid and a surface modifier to the silica wet gel blanket and reacting the mixture to prepare a hydrophobic silica wet gel blanket, and 5) drying the hydrophobic silica wet gel blanket, and the method further including punching the base material for a blanket of Step 2) or the silica wet gel blanket of Step 3) to form holes with an average diameter of 0.01 mm to 3.20 mm on a surface is further included.

Advantageous Effects

A hydrophobic silica aerogel blanket according to the present invention has holes, so that the diffusion of a surface modifier is facilitated in a blanket during a surface modification process to improve the efficiency of surface modification. Accordingly, the hydrophobic silica aerogel blanket has not only excellent physical properties such as specific surface area and thermal conductivity, but also a controlled degree of hydrophobicity, and thus, may have high hydrophobicity.

A method for preparing hydrophobic silica aerogel according to the present invention is capable of simultaneously performing surface modification and solvent substitution in one step, and thus, has short preparation time, thereby having excellent productivity and economic feasibility. Also, by forming holes by punching a base material for a blanket or a wet gel blanket before the surface modification, the diffusion of a surface modifier may be facilitated. Accordingly, the efficiency of a surface modification reaction is increased, so that the hydrophobicity of silica aerogel to be prepared may be improved.

Therefore, the preparation method and hydrophobic silica aerogel according to the present invention may be easily applied to an industry requiring the same, particularly an industry requiring silica aerogel having high hydrophobicity, or an industry requiring silica aerogel having a degree of hydrophobicity in various ranges.

MODE FOR CARRYING OUT THE INVENTION

Figure 1:
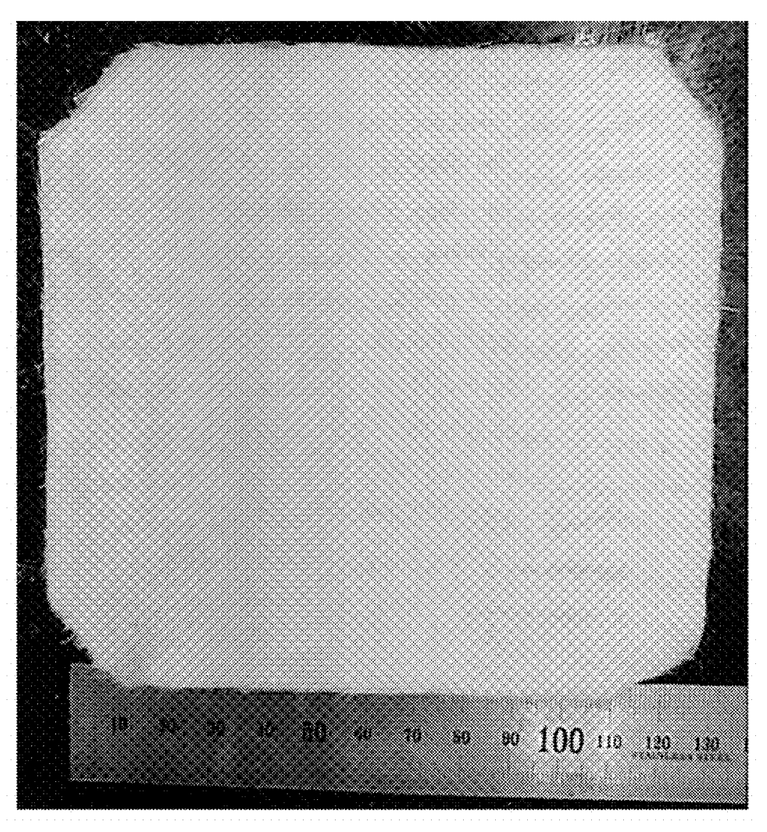
FIG. 1 is a photograph of a silica aerogel blanket of Example 5 according to an embodiment of the present invention.

Hereinafter, the present invention will be described in more detail to facilitate understanding of the present invention.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The present invention provides a method for preparing hydrophobic silica aerogel with improved surface hydrophobicity.

In general, a silica wet gel prepared using water glass has a form in which pores are filled with water which is a solvent, and when the solvent is simply dried to be removed, the solvent in a liquid phase vaporizes into a gaseous phase and due to the high surface tension of water at a gas/liquid interface, it is likely that contraction and cracking occurs in the structure of the pores, thereby causing the reduction in surface area and change in the structure of the pores. Accordingly, in order to maintain the pore structure of the wet gel, it is necessary to substitute water having a high surface tension with an organic solvent having a relatively low surface tension, and there is a need for a technique for washing and drying a wet gel without causing the contraction thereof while maintaining the structure of the wet gel.

In addition, the dried silica aerogel maintains a low thermal conductivity rate just after being dried, but absorbs water in the air due to the hydrophilic properties of a silanol group (Si—OH) on the surface of silica, thereby having a disadvantage in that the thermal conductivity is gradually increased. Therefore, in order to maintain a low thermal conductivity, there is a need to modify the surface of the silica aerogel to be hydrophobic. Therefore, a method in which the surface of the silica aerogel is modified to be hydrophobic using a surface modifier is being widely used. However, in order to prepare silica aerogel having high hydrophobicity using only a surface modifier, a large amount of surface modifier is required. Also, it is not easy to control a surface modification reaction, so that there is a problem of poor productivity.

Therefore, the present invention provides silica aerogel of high hydrophobicity with excellent physical properties while maintaining a pore structure of the silica aerogel and low thermal conductivity, a method for preparing the same.

First, a hydrophobic silica aerogel blanket according to an embodiment of the present invention is characterized by including two or more holes having an average diameter of 0.01 mm to 3.20 mm on a surface, wherein the gap between the holes is 1.5 mm to 50.0 mm, and the aspect ratio of the cross-section of the holes is 1.00 to 5.00.

Here, a hole may represent a through hole completely penetrating the hydrophobic silica aerogel blanket in the thickness direction, or a non-through hole not completely penetrating the same but recessed in the thickness direction. In some cases, the hole may have an average diameter gradually increasing or decreasing in the thickness direction of the blanket. In addition, the cross-sectional shape of the hole on a surface may be a closed curve shape such as a circle, an ellipse, or the like, or a closed polygon line such as a polygon, a star, or the like, but the shape thereof is not limited thereto. It may mean that the average diameter on the surface, that is, the average value of the lengths of lines passing through the center of a closed curve or closed polygon line is in the above-described range.

Accordingly, a hydrophobic silica aerogel blanket according to another embodiment of the present invention is characterized by including any one or more of a through hole and a non-through hole having an average diameter of 0.01 mm to 3.20 mm on a surface.

In addition, the hydrophobic silica aerogel blanket according to another embodiment of the present invention may include a plurality of holes, wherein the holes may all be through holes, or may all be non-through holes, or some of the holes may be through holes and the rest thereof may be non-through holes.

In addition, the hole may be formed using a punching device such as a laboratory needle, a needling machine, or a punch. A needle of the punching device used at this time may be, for example, a needle having a thickness or diameter classified according to a Birmingham gauge, and the shape of the needle may generally be a cylindrical shape with a constant cross-sectional diameter, but may be a conical shape with a gradually narrowing thickness. The shape is not particularly limited as long as it is capable of punching.

When the average diameter of the holes formed in the silica aerogel blanket is less than 0.01 mm, the widths of the holes are too small to help smooth diffusion of a surface modifier, so that there is little improvement in surface modification efficiency compared to when the holes are not formed in the blanket. When greater than 3.20 mm, the diameters are too large, and thus, when applied as an insulation material, the holes act as passages through which heat may pass, which may cause a problem of lowering thermal insulation.

Therefore, in the present invention, in terms of preventing an increase in thermal conductivity which indicates thermal insulation while having excellent surface modification efficiency, thereby ensuring a surface modification effect of a desired level by only a small amount of a surface modifier, and in terms of shortening surface modification time to improve overall process efficiency, the average diameter of the holes may preferably be 0.05 mm to 3.10 mm, 0.10 mm to 3.05 mm, more preferably 0.10 mm to 3.00 mm, or 0.10 mm to 2.50 mm, even more preferably 0.10 mm to 2.00 mm, or 0.15 mm to 1.50 mm.

As another example, the average diameter of the holes on a surface may be 0.01 to 1.50 mm, 0.01 to 1.00 mm, 0.01 mm to 0.50 mm, or 0.01 mm to 0.14 mm, more preferably 0.01 mm or greater, and less than 0.10 mm, and as another example, the average diameter of the holes on a surface may be 0.10 mm to 3.20 mm, preferably 0.15 mm to 3.05 mm, 0.15 mm to 2.00 mm, more preferably 0.15 mm to 1.50 mm.

In the aerogel blanket according to an embodiment of the present invention, the aspect ratio of the cross-section of the holes may be 1.00 to 5.00. Here, the aspect ratio means the ratio of a long axis to a short axis of the hole cross-section, which may preferably be 1.50 to 5.00, or 1.50 to 3.50, more preferably 1.50 to 3.00. The shape of the hole cross-section is a shape which is not biased towards an ellipse, and when such a shape is satisfied, it is preferable in terms of structural stability of the blanket, and it may contribute to the improvement in thermal conductivity and hydrophobicity. That is, if the shape is not too biased towards an ellipse, there is no problem in effect implementation of the present invention. Even so, the formation of holes having an aspect ratio of 5.00 or greater may not be preferable in terms of structural stability of the blanket. In addition, in comparison with a circular shape, it may be more preferable to have an elliptical shape in terms of improving the thermal insulation effect and specific surface area. Therefore, there is a need to form a hole such that the aspect ratio thereof is 5.00 or less, preferably 1.50 to 5.00, more preferably 1.50 to 3.50 in terms of improving thermal conductivity and hydrophobicity.

In addition, according to an embodiment of the present invention, the aerogel blanket includes two or more holes, and the gap between the holes may be 1.5 mm to 50.0 mm. The gap between the holes is the distance of a straight line connecting two holes by the shortest distance. In the case of a structure in which the gap between two or more holes may be measured, the gap between the holes means an average value of the gaps. When the gap between the holes satisfies the above-described ranges, the dispersibility of a surface modifier may be improved, and the structure of silica gel may be firmly maintained. Also, the formation of cracks due to a through-hole or a non-through hole may be prevented, so that gel structure collapse and insulation performance degradation due to shrinkage during drying may be prevented. In terms of ensuring excellent thermal insulation performance, the gap between the holes may preferably be 1.5 mm to 25.0 mm, more preferably 1.5 mm to 20.0 mm, even more preferably 2.0 mm to 15.0 mm.

In addition, according to an embodiment of the present invention, under the condition of the average diameter of the holes, the aerogel blanket may include 5 or more, 9 or more, preferably 20 or more, more preferably 100 or more, 10,000 or less, 7,000 or less, or 5,000 or less, preferably 3,000 or less, more preferably 2,500 or less holes per blanket unit area of 100 $cm^2$. When the above density of the holes is satisfied, a passage through which heat passes is prevented from being formed to a degree of being able to affect thermal conductivity, so that there is an advantage of ensuring excellent thermal insulation performance.

In addition, according to another embodiment of the present invention, the present invention provides a preparation method capable of preparing the hydrophobic silica aerogel blanket with one or more holes.

The preparation method includes 1) preparing a silica sol, 2) impregnating the silica sol into a base material for a blanket, 3) gelling the silica sol impregnated into the base material for a blanket to form a silica wet gel blanket, 4) adding an inorganic acid and a surface modifier to the silica wet gel blanket and reacting the mixture to prepare a hydrophobic silica wet gel blanket, and 5) drying the hydrophobic silica wet gel blanket, wherein punching the base material for a blanket of Step 2) or the silica wet gel blanket of Step 3) to form holes with an average diameter of 0.01 mm to 3.20 mm on a surface is further included.

Hereinafter, the preparation method will be described with reference to a case in which the process of forming holes through punching is performed in Step 3) of forming a silica wet gel blanket, and other than the order in which a punching process is performed, the same may be applied to both cases.

As an example, the preparation method is characterized by including 1) preparing a silica sol, 2) impregnating the silica sol into a base material for a blanket, 3) gelling the silica sol impregnated into the base material for a blanket to form a silica wet gel blanket, 4) punching the silica wet gel blanket to form holes with an average diameter of 0.01 mm to 3.20 mm on a surface, 5) adding an inorganic acid and a surface modifier to the punched silica wet gel blanket and reacting the mixture to prepare a hydrophobic silica wet gel blanket, and 6) drying the hydrophobic silica wet gel blanket.

Step 1) above is a step of preparing silica sol, and the silica sol may be prepared by mixing a silica precursor and an acid catalyst, and an alcohol may be further added if necessary.

The silica precursor may specifically be a water glass solution, and in the silica sol, the acid catalyst may be contained at a molar ratio of 1 to 3 with respect to water glass in the water glass solution.

The water glass solution may be a diluted solution prepared by adding and then mixing distilled water with water glass. The water glass may be sodium silicate ($Na_2SiO_3$) which is an alkali silicate salt obtained by melting silicon dioxide ($SiO_2$) and alkali.

The water glass dispersion may contain 1 wt % to 11 wt % of silicon dioxide ($SiO_2$). If the silicon dioxide is contained in the water glass dispersion in a lower content than the above range, aerogel may not be properly formed, and when the silicon dioxide is contained in a higher content than the above range, specific surface area may be degraded.

The acid catalyst may be mixed with the silicon dioxide in the water glass solution in the silica sol and react with a surface modifier in a surface modifier solution to be described later to activate the decomposition of the surface modifier, and accordingly, a surface modification reaction may be improved, and ammonia generation may be promoted to increase pH, thereby inducing gelation. The acid catalyst is not particularly limited, and any one or more of an organic acid and an inorganic acid may be used. For example, the acid catalyst may be one or more selected from the group consisting of acetic acid, oxalic acid, nitric acid, hydrochloric acid, sulfuric acid, and hydrofluoric acid. Specifically, the acid catalyst may be nitric acid or acetic acid.

The acid catalyst may be included in an amount which allows the pH of the silica sol to be 4 to 8. If the pH of the silica sol is out of the above range, the gelation in Step 3) to be described later may not be easily achieved, or a gelation rate may be too low, so that processability may be degraded.

Step 2) is a step of forming a gel-blanket composite by impregnating the silica sol into a base material for a blanket.

Here, the base material for a blanket according to an embodiment of the present invention may specifically be a porous base material in terms of improving the thermal insulation properties of a silica aerogel blanket. When a porous base material for a blanket is used, a silica sol is allowed to easily penetrate into the base material, and thus, forms an aerogel uniformly inside the base material for a blanket, so that a silica aerogel blanket prepared may have excellent thermal insulation properties.

The base material for a blanket which may be used according to an embodiment of the present invention may be a film, a sheet, a net, a fiber, a foam, a non-woven body, or a laminate of two or more layers thereof. Also, according to the use of the base material for a blanket, surface roughness may be formed or patterned on the surface thereof. More specifically, the base material for a blanket may be a fiber capable of further improving thermal insulation performance by including a space or a void through which a silica aerogel may be easily inserted into the base material for a blanket. Furthermore, the base material for a blanket may preferably have low thermal conductivity.

Specifically, the base material for a blanket may be polyamide, polybenzimidazole, polyaramid, an acryl resin, a phenol resin, polyester, polyetheretherketone (PEEK), polyolefin (e.g., polyethylene, polypropylene, a copolymer thereof, or the like), cellulose, carbon, cotton, wool, hemp, a non-woven fabric, glass fiber, a ceramic wool, or the like.

More specifically, the base material for a blanket in the present invention may be glass fiber.

In addition, according to an embodiment of the present invention, the impregnation may be performed by pouring silica sol into a reaction vessel including the base material for a blanket or by wetting the base material for a blanket with silica sol. At this time, in order to improve the bonding of the blanket base material and the silica sol, the blanket base material may be lightly pressed down to be sufficiently impregnated. Thereafter, the base material for a blanket may be pressed to a predetermined thickness with a constant pressure to remove excess silica sol, so that drying time may be reduced.

Step 3) above is a step of preparing a hydrophobic silica wet gel blanket, and the wet gel blanket may be prepared by leaving the silica sol impregnated in the base material for a blanket to stand to be gelled.

Here, the gelation may be a sol-gel reaction, and the "sol-gel reaction" may be forming a network structure from a silicon unit precursor material.

Here, the network structure may be a planar mesh structure in which specific polygons having one or more types of atomic arrangement are linked to each other, or a structure in which specific polyhedrons share their vertices, edges, faces, and the like with each other to form a three-dimensional skeleton structure.

The preparation method according to an embodiment of the present invention may further perform a step of aging the silica wet gel blanket prepared after the gelation of Step 3) above.

The aging is not particularly limited, but may be performed, for example, by leaving to stand at a temperature of 50° C. to 90° C. for one hour to 24 hours.

The preparation method according to an embodiment of the present invention performs aging after preparing a silica wet gel blanket, so that the network structure of wet gel in the silica wet gel blanket may be further firmly formed, and accordingly, pore properties may be excellent.

Step 4) above is punching the silica wet gel blanket to form holes having an average surface diameter of 0.01 mm to 3.20 mm. Here, the range of a preferred average surface diameter of the holes is the same as described with respect to the above-described aerogel blanket.

Specifically, Step 4) above may be punching the silica wet gel blanket to form through holes having an average surface diameter of 0.01 mm to 3.20 mm, or forming non-through holes having an average surface diameter of 0.01 mm to 3.20 mm, or forming both the through holes and the non-through holes.

In addition, according to an embodiment of the present invention, punching may be performed to satisfy the condition of a hole in the above-described aerogel blanket. For example, the aerogel blanket may be punched to include two or more holes, and the punching may be performed such that the gap between the holes is, as described above, 1 mm to 50 mm, 1 mm to 30 mm, 1 mm to 15 mm, or 2 mm to 10 mm, and the punching may be performed such that 1 to 10,000, preferably 9 to 10,000, or 20 to 7,000 holes are included per aerogel blanket unit area of 100 $cm^2$.

At this time, as long as holes may be formed in the blanket by punching, the type of a punching device is not limited. However, in terms of facilitating the formation of holes having the above-described width, a punching device such as a laboratory needle, a needling device (needling machine), and a punch may be specifically used. In the present invention, the needling device and the punch refer to a device including at least one punching member of a specific diameter capable of forming a hole, for example, a needle, and may be, for example, a plurality of needles formed at specific intervals on a polygonal plate-like member. At this time, a needle included in a punching device to be used may be, for example, a needle having a thickness or diameter classified according to a Birmingham gauge.

In addition, it is preferable that the punching is performed before drying. After the drying, there is a risk that aerogel may be greatly damaged by a strong physical impact in that it is a dry particle having hydrophobicity after the completion of surface modification, and during punching, there is a loss of aerogel in a portion to be punched as well as a loss of the surroundings of the aerogel, so that it is preferable that the punching is performed before the drying.

Step 5) above is a step of surface modifying the punched silica wet gel blanket, which is to add and react an inorganic acid and a surface modifier to form a hydrophobic silica wet gel blanket.

At this time, as the surface modifier, a surface modification active ingredient may be used alone, or a surface modification solution in which a surface modification active ingredient and a non-polar organic solvent are mixed may be used. The surface modification solution may be prepared by adding a surface modification active ingredient to a non-polar organic solvent, followed by mixing. At this time, the concentration of the surface modification active ingredient in the surface modification solution may be 0.1 M to 4.0 M. That is, the surface modification solution may be prepared by adding a surface modification active ingredient to a non-polar organic solvent in an amount of 0.1 M to 4 M, followed by mixing.

In addition, the surface modification solution may be added in an amount which allows the molar ratio of the surface modification active ingredient with respect to water glass in silica sol to be 0.1 to 10. In terms of improving surface modification reactivity and reducing the cost of raw materials, the surface modification solution may be added in an amount which allows the molar ratio to be, preferably 0.1 to 5.0, and more preferably 0.5 to 3.0. If the surface modification solution is added in an amount which allows the molar ratio of the surface modification active ingredient to the water glass to be less than 0.1, the amount of the surface modification active ingredient which may react with a silanol group (Si—OH) in the silica sol is relatively small, so that the surface modification reactivity may be degraded, and the surface modification may not be easily achieved. Accordingly, during drying, the silanol group not surface-modified may cause a condensation reaction, resulting in a problem in that a silica aerogel blanket finally prepared has a reduced pore size and may not achieve porosity. In addition, if the surface modification solution is added in an amount which allows the molar ratio of the surface modification active ingredient to the water glass to be greater than 10, there may be a large amount of residual surface modification active ingredient which does not participate in the surface modification reaction, resulting in wasting the surface modification active ingredient, which is expensive, thereby causing a problem of degrading economic feasibility.

The surface modification active ingredient may be one or more selected from the group consisting of trimethylchlorosilane (TMCS), hexamethyldisilazane (HMDS), methyltrimethoxysilane, and trimethylethoxysilane.

The non-polar organic solvent may be one or more selected from the group consisting of hexane, heptane, toluene, and xylene.

The surface modification reaction of Step 5) above may be performed by adding an inorganic acid and a surface modifier to silica wet gel, followed by mixing, and the surface modification reaction may be performed at a temperature of 25° C. to 95° C. In addition, as an example, the mixing may be performed by stirring.

At this time, the stirring is not particularly limited, but may be, for example, stirring at a rate of 50 rpm to 700 rpm.

In addition, Step 5) according to an embodiment of the present invention may be performed for 2 to 24 hours, and may be preferably performed for 2 to 12 hours, or 2 to 8 hours in terms of improving the economic feasibility of a process while maintaining the surface modification effect at an excellent level.

The preparation method according to an embodiment of the present invention may perform solvent substitution while performing the surface modification reaction.

Specifically, in the above preparation method, by adding an inorganic acid to silica wet gel, followed by mixing and reacting a surface modification solution, the decomposition of a surface modifier in the surface modification solution may be activated by the inorganic acid, and accordingly, a surface modification reaction may be promoted. In addition, solvent substitution may be achieved by a non-polar organic solvent included in the surface modification solution while the surface modification reaction proceeds. Therefore, compared to a typical preparation method in which a solvent substitution process through an alcohol, the process requiring multiple repetitions, and a subsequent surface modification process are applied, the preparation method according to an embodiment of the present invention simultaneously performs solvent substitution and surface modification in one step as described above, so that process steps and process time may be reduced, and productivity and economic feasibility may be improved. Furthermore, since a surface modification reaction may be effectively performed only with a small amount of a surface modification active ingredient, a silica aerogel blanket having an excellent degree of hydrophobicity may be prepared.

In addition, according to an embodiment of the present invention, since a step of punching is included in Step 4) above, during the surface modification reaction of Step 5), the diffusion of the surface modifier in the silica wet gel blanket is facilitated, so that the efficiency of the surface modification reaction may be greatly increased. Also, since the surface modifier is uniformly diffused, the degree of hydrophobicity of an aerogel blanket to be finally prepared is improved, and thermal insulation performance may be effectively improved.

In addition, by facilitating the diffusion of the surface modifier, even when an aerogel blanket is prepared using a thick base material for a blanket, the aerogel blanket may have a high degree of hydrophobicity, and accordingly, it is possible to expand the thickness range of a base material for a blanket which may be used.

Step 6) above is a step of drying the hydrophobic silica wet gel blanket in order to prepare a hydrophobic silica aerogel blanket.

At this time, a step of washing may be further performed before the drying.

The washing is to obtain high purity hydrophobic silica aerogel by removing impurities (sodium ions, non-reactants, by-products, and the like) generated during the reaction. The washing may be performed by adding a non-polar organic solvent to the hydrophobic silica wet gel and stirring the mixture for 20 minutes to 1 hour, but is not limited thereto.

The drying may be performed by a method such as atmospheric drying or supercritical drying, but is not limited thereto. As an example, the atmospheric drying may be a method of drying at atmospheric pressure for 1 to 12 hours under a temperature condition of 100° C. to 190° C., and the supercritical drying is a method performed using $CO_2$ in a supercritical state. The atmospheric drying has an advantage of being relatively simple and economical, and the supercritical drying may have an advantage of effectively removing a fluid inside the gel.

The hydrophobic silica aerogel blanket according to an embodiment of the present invention is prepared by the above preparation method, and thus, may greatly improve surface modification efficiency, and accordingly, has high hydrophobicity while having excellent physical properties such as excellent pore properties, thereby ensuring thermal insulation performance at an excellent level.

According to yet another embodiment of the present invention, the present invention provides a preparation method different from the above-described method for preparing a hydrophobic silica aerogel blanket with one or more holes.

Specifically, the preparation method is characterized by including 1) preparing a silica sol, 2) punching a base material for a blanket to form holes with an average diameter of 0.01 mm to 3.20 mm on a surface, 3) impregnating the silica sol into the punched base material for a blanket, 4) gelling the silica sol impregnated into the base material for a blanket to form a silica wet gel blanket, 5) adding an inorganic acid and a surface modifier to the silica wet gel blanket and reacting the mixture to prepare a hydrophobic silica wet gel blanket, and 6) drying the hydrophobic silica wet gel blanket.

In the method for preparing a hydrophobic silica aerogel blanket, Step 4) in the above-described preparation method may be modified as punching a base material for a blanket in Step 2. That is, the process of punching in order to finally form holes in the silica aerogel blanket may be performed before the silica sol is impregnated into the base material for a blanket and gelled, or after the silica sol is impregnated and gelled, and then the wet gel blanket is formed. In other words, the major function of the formation of the holes is to facilitate the diffusion of a surface modifier and to allow a uniform surface modification reaction, and thus, if the formation of the holes is performed before adding the surface modifier, the object of the present invention may be achieved.

According to an embodiment of the present invention, an insulation material including the above-described hydrophobic silica aerogel blanket is provided.

The silica aerogel blanket may be used for various purposes including a thermal insulation purpose including applications requiring thermal insulation, for example, at a temperature of 1000° C. to 1200° C., or higher. For example, the silica aerogel blanket may be used as an insulation material for a pipe, such as a double-casing pipe, and for insulation of aircraft and parts thereof, insulation of buildings, insulation of spacecraft, insulation of automobiles, insulation of clothing, insulation of shoes, and the like. The aerogel blanket may be used in the same manner as in a case in which an aerogel mat or a plurality of aerogel materials are used.

Hereinafter, the present invention will be described in more detail with reference to Examples and Experimental Examples. However, the following Examples and Experimental Examples are merely illustrative of the present invention, and are not intended to limit the scope of the present invention.

Example 1

A reaction solution in which 2.6 ml of acetic acid was added to a water glass solution (containing 13.8 g of water glass) was poured on a 10 mm thick glass fiber web to prepare a silica wet gel blanket. The silica wet gel blanket was aged at 50° C. for about an hour. Thereafter, the silica wet gel blanket was punched with a laboratory needle of a cross-sectional diameter of 0.51 mm and an aspect ratio of 1.8 to form 100 holes (through or non-through) having the same width as the width of the laboratory needle per glass fiber web unit area (100 $cm^2$), and the punching gap was 10 mm. After 7 g of nitric acid was added to the silica wet gel blanket with holes formed thereon, a hexamethyldisilazane (HMDS) solution was added thereto, and the temperature was maintained in an oven at 55° C. for 5 hours to perform a surface modification reaction. At this time, the hexamethyldisilazane solution was prepared by adding 23 g of hexamethyldisilazane to 200 ml of n-hexane, followed by stirring. When the prepared hydrophobic silica wet gel blanket was surface modified and completely floated on an organic solvent (n-hexane) layer at an upper end, the blanket was recovered and then completely dried in a forced circulation dryer at 150° C. for 4 hours to prepare the hydrophobic silica aerogel.

Example 2

A hydrophobic silica aerogel blanket was prepared in the same manner as in Example 1 except that a needle with an aspect ratio of 2.41 was used, a water glass solution containing 20.7 g of water glass was used, and 4.3 ml of acetic acid was mixed.

Example 3

A hydrophobic silica aerogel blanket was prepared in the same manner as in Example 1 except that a needle with an aspect ratio of 1.59 was used, a water glass solution containing 24.1 g of water glass was used, and 5.3 ml of acetic acid was mixed.

Example 4

A hydrophobic silica aerogel blanket was prepared in the same manner as in Example 1 except that a needle with an aspect ratio of 2.57 was used, a water glass solution containing 27.6 g of water glass was used, and 5.7 ml of acetic acid was mixed.

Example 5

A hydrophobic silica aerogel blanket was prepared in the same manner as in Example 5 except that a needle with an aspect ratio of 1.62 was used, and a hexamethyldisilazane solution prepared by adding 15 g of hexamethyldisilazane to 200 ml of n-hexane was used.

Example 6

A hydrophobic silica aerogel blanket was prepared in the same manner as in Example 5 except that a needle with an aspect ratio of 2.10 was used, and a hexamethyldisilazane solution prepared by adding 35 g of hexamethyldisilazane to 200 ml of n-hexane was used.

Example 7 TO 9

A hydrophobic silica aerogel blanket was prepared in the same manner as in Example 4 except that the aspect ratio and punching gap of a needle were adjusted to numerical values shown in Table 1 below. As the punching gap was adjusted, the number of holes formed in 100 cm$^2$ of the blanket was also changed as shown in Table 1 below.

Examples 10 to 12

A hydrophobic silica aerogel blanket was prepared in the same manner as in Example 4 except that the cross-sectional diameter and aspect ratio of a laboratory needle were adjusted to numerical values shown in Table 1 below.

Example 13

A hydrophobic silica aerogel blanket was prepared in the same manner as in Example 4 except that a needle with an aspect ratio of 1.92 was used, and the surface modification reaction duration was adjusted to 12 hours.

Example 14

A hydrophobic silica aerogel blanket was prepared in the same manner as in Example 4 except that a needle with a diameter of 0.51 mm and an aspect ratio of 4.71 was used.

Comparative Example 1

A reaction solution in which 2.6 ml of acetic acid was added to a water glass solution (containing 13.8 g of water glass) was poured on a glass fiber web having a thickness of 10 mm and an area 100 cm$^2$ to prepare a silica wet gel blanket. The silica wet gel blanket was aged at 50° C. for about an hour. Thereafter, a process of adding ethanol to the silica wet gel blanket to substitute a solvent for one day was repeated three times, and then a process of adding n-hexane to the ethanol-substituted silica wet gel blanket to substitute with an organic solvent for one day was repeated three times. A hexamethyldisilazane (HMDS) solution was added to the solvent-substituted silica wet gel blanket, and the temperature was maintained in an oven at 55° C. for 12 hours to perform a surface modification reaction. At this time, the hexamethyldisilazane solution was prepared by adding 23 g of hexamethyldisilazane to 200 ml of n-hexane, followed by stirring. Thereafter, the prepared hydrophobic silica wet gel blanket was recovered, and then completely dried in a forced circulation dryer at 150° C. for 4 hours to prepare hydrophobic silica aerogel.

Comparative Example 2

A hydrophobic silica aerogel blanket was prepared in the same manner as in Comparative Example 1 except that a water glass solution containing 17.2 g of water glass was used, and 3.3 ml of acetic acid was mixed.

Comparative Example 3

A hydrophobic silica aerogel blanket was prepared in the same manner as in Comparative Example 1 except that a water glass solution containing 20.7 g of water glass was used, and 4.3 ml of acetic acid was mixed.

Comparative Example 4

A hydrophobic silica aerogel blanket was prepared in the same manner as in Comparative Example 1 except that a water glass solution containing 24.1 g of water glass was used, and 5.3 ml of acetic acid was mixed.

Comparative Example 5

A hydrophobic silica aerogel blanket was prepared in the same manner as in Comparative Example 1 except that a water glass solution containing 27.6 g of water glass was used, and 5.7 ml of acetic acid was mixed.

Comparative Example 6

A hydrophobic silica aerogel blanket was prepared in the same manner as in Comparative Example 5 except that a hexamethyldisilazane solution prepared by adding 15 g of hexamethyldisilazane to 200 ml of n-hexane was used.

Comparative Example 7

A hydrophobic silica aerogel blanket was prepared in the same manner as in Comparative Example 5 except that a hexamethyldisilazane solution prepared by adding 35 g of hexamethyldisilazane to 200 ml of n-hexane was used.

Comparative Example 8

A hydrophobic silica aerogel blanket was prepared in the same manner as in Example 1 except that a punching step was not performed.

Comparative Example 9

A hydrophobic silica aerogel blanket was prepared in the same manner as Example 1 except that a water glass solution containing 17.2 g of water glass was used, 3.3 ml of acetic acid was mixed, and a punching step was not performed.

Comparative Example 10

A hydrophobic silica aerogel blanket was prepared in the same manner as in Example 2 except that a punching step was not performed.

Comparative Example 11

A hydrophobic silica aerogel blanket was prepared in the same manner as in Example 3 except that a punching step was not performed.

Comparative Example 12

A hydrophobic silica aerogel blanket was prepared in the same manner as in Example 4 except that a punching step was not performed.

Comparative Example 13

A hydrophobic silica aerogel blanket was prepared in the same manner as in Example 5 except that a punching step was not performed.

Comparative Example 14

A hydrophobic silica aerogel blanket was prepared in the same manner as in Example 6 except that a punching step was not performed.

Comparative Example 15

A hydrophobic silica aerogel blanket was prepared in the same manner as in Example 3 except that the cross-sectional diameter of a laboratory needle was adjusted to 3.4 mm.

Comparative Example 16

A hydrophobic silica aerogel blanket was prepared in the same manner as in Example 1 except that the content of water glass contained in a water glass solution was changed to 60.3 g, the content of acetic acid was changed to 13.3 ml, the content of hexamethyldisilazane was changed to 57.5 g, the content of nitric acid was changed to 17.5 g, and the thickness of the glass fiber web was changed to 17.5 mm, and a punching step was not performed.

Comparative Example 17

A hydrophobic silica aerogel blanket was prepared in the same manner as in Example 3 except that a needle with an aspect ratio of 1.62 was used, and the gap between holes was 60 mm.

Comparative Example 18

A hydrophobic silica aerogel blanket was prepared in the same manner as in Example 3 except that a needle with an aspect ratio of 1.53 was used, and the gap between holes was 1 mm.

The preparation conditions of Examples are shown in Table 1 below, and the preparation conditions of Comparative Examples are shown in Table 2 below.

TABLE 1

| Classification | Punching or no punching | Hole diameter (mm) | Aspect ratio | Punching gap (mm) | Number of holes (pcs/100 cm$^2$) | Thickness of fiber (mm) | Surface modification duration (h) |
|---|---|---|---|---|---|---|---|
| Example 1 | ○ | 0.51 | 1.80 | 10 | 100 | 10 | 5 |
| Example 2 | ○ | 0.51 | 2.41 | 10 | 100 | 10 | 5 |
| Example 3 | ○ | 0.51 | 1.59 | 10 | 100 | 10 | 5 |
| Example 4 | ○ | 0.51 | 2.57 | 10 | 100 | 10 | 5 |
| Example 5 | ○ | 0.51 | 1.62 | 10 | 100 | 10 | 5 |
| Example 6 | ○ | 0.51 | 2.10 | 10 | 100 | 10 | 5 |
| Example 7 | ○ | 0.51 | 1.57 | 2 | 2500 | 10 | 5 |
| Example 8 | ○ | 0.51 | 2.10 | 5 | 400 | 10 | 5 |
| Example 9 | ○ | 0.51 | 1.99 | 30 | 16 | 10 | 5 |
| Example 10 | ○ | 0.18 | 1.62 | 10 | 100 | 10 | 5 |
| Example 11 | ○ | 1.47 | 1.73 | 10 | 100 | 10 | 5 |
| Example 12 | ○ | 3.05 | 1.75 | 10 | 100 | 10 | 5 |
| Example 13 | ○ | 0.51 | 1.92 | 10 | 100 | 10 | 12 |
| Example 14 | ○ | 0.51 | 4.71 | 10 | 100 | 10 | 5 |

TABLE 2

| Classification | Punching or no punching | Hole diameter (mm) | Aspect ratio | Punching gap (mm) | Number of holes (pcs/100 cm$^2$) | Surface modification duration (h) |
|---|---|---|---|---|---|---|
| Comparative Example 1 | X | — | — | — | — | 12 |
| Comparative Example 2 | X | — | — | — | — | 12 |
| Comparative Example 3 | X | — | — | — | — | 12 |
| Comparative Example 4 | X | — | — | — | — | 12 |
| Comparative Example 5 | X | — | — | — | — | 12 |
| Comparative Example 6 | X | — | — | — | — | 12 |
| Comparative Example 7 | X | — | — | — | — | 12 |
| Comparative Example 8 | X | — | — | — | — | 5 |
| Comparative Example 9 | X | — | — | — | — | 5 |
| Comparative Example 10 | X | — | — | — | — | 5 |
| Comparative Example 11 | X | — | — | — | — | 5 |
| Comparative Example 12 | X | — | — | — | — | 5 |

TABLE 2-continued

| Classification | Punching or no punching | Hole diameter (mm) | Aspect ratio | Punching gap (mm) | Number of holes (pcs/100 cm$^2$) | Surface modification duration (h) |
|---|---|---|---|---|---|---|
| Comparative Example 13 | X | — | — | — | — | 5 |
| Comparative Example 14 | X | — | — | — | — | 5 |
| Comparative Example 15 | ○ | 3.4 | 1.62 | 10 | 100 | 5 |
| Comparative Example 16 | X | — | — | — | — | 5 |
| Comparative Example 17 | ○ | 0.51 | 1.62 | 60 | 4 | 5 |
| Comparative Example 18 | ○ | 0.51 | 1.53 | 1 | 10,000 | 5 |

Experimental Examples

In order to conduct comparative analysis of the physical properties of each of the hydrophobic silica aerogel blankets prepared in Examples and Comparative Examples above, the specific surface area (BET, m$^2$/g), carbon content (wt %), and thermal conductivity of each aerogel were measured.

1) Measurement of Thermal Conductivity (mW/mK)

The room temperature (about 23° C.) thermal conductivity of the silica aerogel blanket prepared in each of Examples and Comparative Examples was measured using HFM 436 of NETZSCH Co.

2) Carbon Content (wt %)

The carbon content was measured using a carbon analyzer (Carbon-Sulfur Analyzer CS-2000, Eltra Co.). The greater the carbon content, the higher the degree of hydrophobicity of the aerogel blanket.

3) Specific Surface Area (BET, m$^2$/g)

The specific surface area was analyzed by the amount of nitrogen adsorption/desorption according to partial pressure (0<p/p$_0$<1) using a 3FLEX apparatus (Micrometrics Co.).

Specifically, 100 mg of each aerogel blanket was put into a cylinder and pre-treated at 200° C. for 8 hours to measure the specific surface area using the specific surface area measuring device.

4) Measurement Results

Examples and Comparative Examples which may be compared are grouped and shown in Tables 3 to 5 as follows.

TABLE 3

| Classification | Thermal conductivity (mW/mK) | Carbon content (wt %) | Specific surface area (m$^2$/g) |
|---|---|---|---|
| Example 1 | 26.5 | 11.3 | 683 |
| Example 2 | 25.4 | 11.5 | 692 |
| Example 3 | 26.6 | 11.1 | 680 |
| Example 4 | 25.4 | 11.8 | 695 |
| Example 5 | 26.2 | 11.1 | 680 |
| Example 6 | 20.4 | 12.1 | 725 |
| Example 13 | 20.6 | 12.2 | 732 |
| Comparative Example 1 | 26.6 | 11.3 | 681 |
| Comparative Example 2 | 28.5 | 10.2 | 673 |
| Comparative Example 3 | 25.7 | 11.5 | 685 |
| Comparative Example 4 | 27.1 | 10.8 | 671 |
| Comparative Example 5 | 26.2 | 11.4 | 680 |
| Comparative Example 6 | 28.3 | 10.4 | 643 |
| Comparative Example 7 | 23.4 | 11.8 | 685 |
| Comparative Example 8 | 31.3 | 10.1 | 530 |
| Comparative Example 9 | 32.4 | 9.8 | 457 |
| Comparative Example 10 | 31.5 | 10.2 | 531 |
| Comparative Example 11 | 32.1 | 9.8 | 504 |
| Comparative Example 12 | 31.7 | 9.5 | 525 |
| Comparative Example 13 | 32.8 | 9.9 | 557 |
| Comparative Example 14 | 31.4 | 10.1 | 506 |
| Comparative Example 16 | 33.0 | 9.5 | 473 |

Referring to Table 3 above, it can be confirmed that Examples 1 to 6 according to the preparation method of the present invention achieved an effect that has a level equal to or higher than that of Comparative Examples 1 to 7 in which a typical solvent substitution process and a typical surface modification process were performed, which can be said to be a significantly improved effect considering that the productivity was improved by about 2 times or more (the surface modification process time was 5 hours in the case of Examples and 12 hours in the case of Comparative Examples 1 to 7). In addition, in the case of Comparative Examples 8 to 14, the same process as in the present invention was applied for solvent substitution and surface modification using an inorganic acid, but punching was not performed, and it is confirmed that the thermal conductivity and specific surface area properties thereof are very poor compared to the Examples. Therefore, it can be seen that a punching process and solvent substitution and surface modification processes using an inorganic acid may have a synergistic effect through mutual organic bonding. In addition, as in Example 13, when the surface modification process is applied for 12 hours as in Comparative Examples 1 to 7, it can be confirmed that the performance is very excellent, and in the case of Comparative Example 16 prepared by increasing the contents of raw materials, it can be also confirmed that such preparation method does not help at all in improving performance.

TABLE 4

| Classification | Thermal conductivity (mW/mK) | Carbon content (wt %) | Specific surface area (m²/g) |
|---|---|---|---|
| Example 7 | 23.5 | 11.2 | 715 |
| Example 8 | 21.3 | 11.3 | 728 |
| Example 9 | 27.1 | 11.2 | 657 |
| Comparative Example 17 | 30.5 | 10.5 | 535 |
| Comparative Example 18 | — | — | — |

The results shown in Table 4 above confirm the effect on the gap between holes. In the case of Comparative Examples 17 and 18 in which the gap between holes is not within 1.5 mm to 50.0 mm, it can be confirmed that the performance thereof is very poor. Particularly, Comparative Example 18 could not be prepared as a specimen due to structural instability since holes were formed too densely.

TABLE 5

| Classification | Thermal conductivity (mW/mK) | Carbon content (wt %) | Specific surface area (m²/g) |
|---|---|---|---|
| Example 10 | 22.7 | 11.3 | 680 |
| Example 11 | 23.3 | 11.5 | 676 |
| Example 12 | 26.8 | 11.7 | 663 |
| Comparative Example 15 | 29.8 | 10.2 | 615 |

Referring to Table 5 above, it can be confirmed that Comparative Example 15 in which the diameter of a hole is greater than 3.20 mm has problems in that the thermal conductivity thereof is poorer and the specific surface area and hydrophobicity thereof are significantly lower than those of Examples 10 to 12 in which the diameter of a hole is equal to or less than that.

Through the above, it can be confirmed that Examples to 14 which have holes formed in accordance with specifications according to the preparation method of the present invention have excellent performance compared to Comparative Examples 1 to 18 which do not.

The invention claimed is:

1. A surface hydrophobically modified hydrophobic silica aerogel blanket, comprising two or more holes having an average diameter of 0.01 mm to 3.20 mm on a surface,
   wherein a gap between the holes is 1.5 mm to 50.0 mm, and
   an aspect ratio of the cross-section of the holes is 1.50 to 5.00.

2. The aerogel blanket of claim 1, wherein the holes are either through holes or non-through holes.

3. The aerogel blanket of claim 1, wherein the average diameter of the holes is 0.05 to 3.05 mm.

4. The aerogel blanket of claim 1, wherein the number of holes in a unit area of 100 cm² of the aerogel blanket is 5 to 10,000 holes.

5. An insulation material comprising the aerogel blanket of claim 1.

\* \* \* \* \*